(12) United States Patent
Meyer et al.

(10) Patent No.: US 11,679,805 B2
(45) Date of Patent: Jun. 20, 2023

(54) TRACTION STEER MITIGATION THROUGH CVR GAIN SCALARS

(71) Applicant: STEERING SOLUTIONS IP HOLDING CORPORATION, Saginaw, MI (US)

(72) Inventors: Jeffrey R. Meyer, Munger, MI (US); Kameron M. Carey, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 99 days.

(21) Appl. No.: 16/825,413

(22) Filed: Mar. 20, 2020

(65) Prior Publication Data

US 2020/0307687 A1 Oct. 1, 2020

Related U.S. Application Data

(60) Provisional application No. 62/827,548, filed on Apr. 1, 2019.

(51) Int. Cl.
  *B62D 6/04* (2006.01)
  *B62D 5/04* (2006.01)

(52) U.S. Cl.
  CPC ............. *B62D 6/04* (2013.01); *B62D 5/0463* (2013.01)

(58) Field of Classification Search
  None
  See application file for complete search history.

(56) References Cited

U.S. PATENT DOCUMENTS

| | | | |
|---|---|---|---|
| 6,009,364 A | 12/1999 | Wada et al. | |
| 2002/0017421 A1 | 2/2002 | Stevens et al. | |
| 2007/0265751 A1 | 11/2007 | Tsuchiya | |
| 2009/0204292 A1* | 8/2009 | Tate | B60T 8/175 701/41 |

(Continued)

FOREIGN PATENT DOCUMENTS

| | | | |
|---|---|---|---|
| CN | 106515849 A | 3/2017 | |
| CN | 106697048 A | 5/2017 | |

(Continued)

OTHER PUBLICATIONS

First Office Action regarding corresponding CN App. No. 202010249404.X; dated Jan. 21, 2022.

(Continued)

*Primary Examiner* — Jeff A Burke
*Assistant Examiner* — Jerrod Irvin Davis
(74) *Attorney, Agent, or Firm* — Dickinson Wright PLLC

(57) ABSTRACT

Technical solutions are described for mitigating traction steer using an electric power steering system (EPS). A control system for a power steering system including a processor and memory are provided. The memory includes instructions that, when executed by the processor, cause the processor to generate a motor command as a function of a handwheel velocity, and to modify the motor command based upon a traction torque signal. A method for controlling a power steering system is also provided. The method includes generating a motor command as a function of a handwheel velocity; modifying the motor command based upon a traction torque signal; and applying the motor command to an actuator of the power steering system.

20 Claims, 6 Drawing Sheets

(56) References Cited

U.S. PATENT DOCUMENTS

| | | | |
|---|---|---|---|
| 2016/0075371 A1* | 3/2016 | Varunjikar | B62D 5/049 |
| | | | 701/43 |
| 2016/0214645 A1* | 7/2016 | Owen | B60W 10/20 |
| 2017/0066472 A1* | 3/2017 | Wang | B62D 5/0463 |
| 2018/0304917 A1* | 10/2018 | Michelis | B62D 5/0472 |
| 2019/0100236 A1* | 4/2019 | De Carteret | B62D 5/0481 |
| 2019/0351942 A1* | 11/2019 | de Paula Eduardo | |
| | | | B62D 15/025 |

FOREIGN PATENT DOCUMENTS

| | | |
|---|---|---|
| CN | 107848574 A | 3/2018 |
| CN | 110509979 A | 11/2019 |
| DE | 19536989 A1 | 4/1996 |
| DE | 10345484 A1 | 4/2005 |
| DE | 102004060030 A1 | 6/2006 |
| DE | 102019111388 A1 | 11/2019 |

OTHER PUBLICATIONS

Official Letter from German Patent and Trademark Office regarding corresponding DE App. No. 10 2020 108 132.4; dated Mar. 17, 2022.

* cited by examiner

TRACTION STEER MITIGATION THROUGH CVR GAIN SCALARS

CROSS-REFERENCE TO RELATED APPLICATION

This patent application claims priority to U.S. Provisional Patent Application Ser. No. 62/827,548, filed Apr. 1, 2019, the disclosures of which are incorporated herein by reference in its entirety.

BACKGROUND

The present application is generally related to methods and systems for controlling electric machines, and more particularly to methods and systems for mitigating traction steer.

Traction steer mitigation is especially applicable for high torque output FWD/AWD vehicles, which can be especially prone to the effects of traction steer.

Traction steer events occur when there is a difference in tractive forces at the front wheels, causing an imbalance in the aligning moments about the steering axis. This leads to an unbalanced force at the steering rack. The negative effects of the event are most noticeable when throttle is applied before and/or during a turn, when a sudden bump, dip, or pothole is hit after throttle is applied, or when throttle is applied with the left and right tires are on surfaces with different amounts of friction.

In a midturn scenario, the unbalanced rack force can prevent the handwheel from returning to center holding it anywhere from 15-60 degrees off-center. When a bump is hit, the unbalanced rack force can turn the handwheel suddenly to one side and hold it off-center. When the tires are on surfaces with different amounts of friction, the unbalanced rack force can turn the handwheel and hold it off-center.

The driver can compensate for these traction steer events by forcing the handwheel to center or holding it on center, but it may require extra input torque by the driver.

SUMMARY

According to one or more embodiments, a control system for a power steering system comprises a processor and memory. The memory includes instructions that, when executed by the processor, cause the processor to generate a motor command as a function of a handwheel velocity, and to modify the motor command based upon a traction torque signal.

According to one or more embodiments, a method for controlling a power steering system comprises: generating a motor command as a function of a handwheel velocity; modifying the motor command based upon a traction torque signal; and applying the motor command to an actuator of the power steering system.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
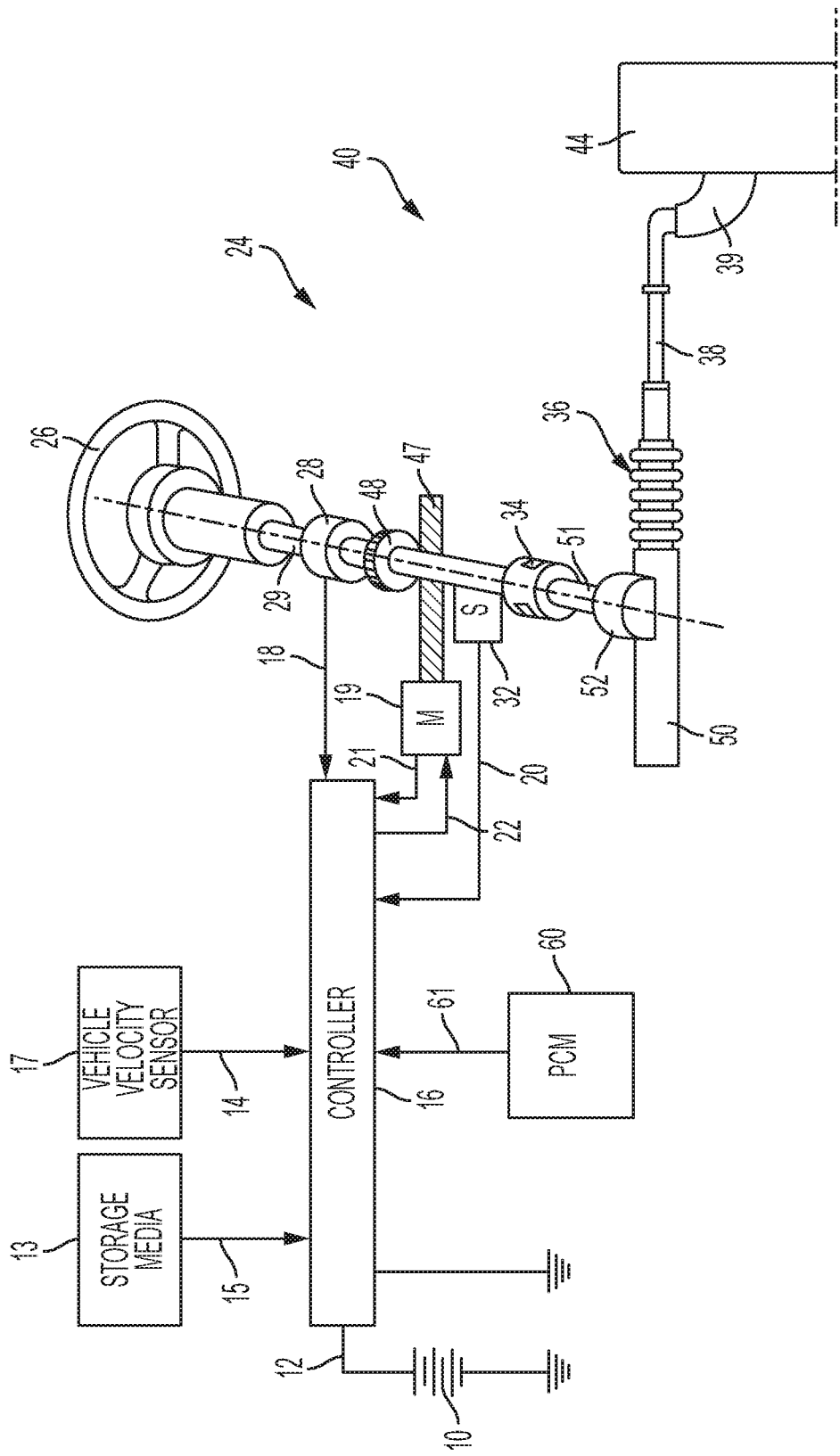
FIG. 1 depicts a block diagram of an exemplary embodiment of an electric power steering system according to aspects of the present disclosure.

Referring now to the figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a handwheel 26 (e.g., a steering wheel and the like), is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor (PMSM), and is hereinafter denoted as electric machine 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted ωm may be measured, calculated or a combination thereof. For example, the motor velocity ωm may be calculated as the change of the motor position θ as measured by a position sensor 32 over a prescribed time interval. For example, motor speed ωm may be determined as the derivative of the motor position θ from the equation ωm=Δθ/Δt where Δt is the sampling time and AO is the change in position during the sampling interval. Alternatively, motor velocity may be derived from motor position as the rate of change of position with respect to time. It will be appreciated that there are numerous well-known methodologies for performing the function of a derivative.

As the handwheel 26 is turned, torque sensor 28 senses the torque applied to the handwheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 16 operates in a feedback control mode, as a current regulator, to generate the command 22. Alternatively, in one or more examples, the controller 16 operates in a feedforward control mode to generate the command 22. Because these voltages are related to the position and speed of the motor 19 and the desired torque, the position and/or speed of the rotor and the torque applied by an operator are determined. A position encoder is connected to the lower steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the foregoing. The position encoder outputs a position signal 20 indicating the angular position of the lower steering shaft 51 and thereby, that of the motor 19. Alternatively, the angular position θ may be measured by a sensor mounted to the steering column and communicated to the steering system. The angular position θ may be communicated, for example, via a CAN bus.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, and as shown in FIG. 1, a powertrain control module (PCM) 60 communicates a traction torque signal 61 to the controller 16. The traction torque signal 61 may be any signal indicating a torque applied by a powertrain to accelerate the vehicle. The traction torque signal 61 may be an engine torque, a transmission torque, or an axle torque. Alternatively, the traction torque signal 61 may indicate a parameter related to traction torque, such as, for example, acceleration force, throttle position or accelerator pedal position. Alternatively or additionally, the controller 16 may directly measure the traction torque signal 61. For example, the controller 16 may be configured to monitor a sensor that measures traction torque or a signal indicative of traction torque, Such a sensor may include, for example, an accelerometer configured to measure acceleration, such as longitudinal and/or lateral acceleration, a throttle position sensor, or an accelerator pedal position sensor.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time-based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

Figure 2:
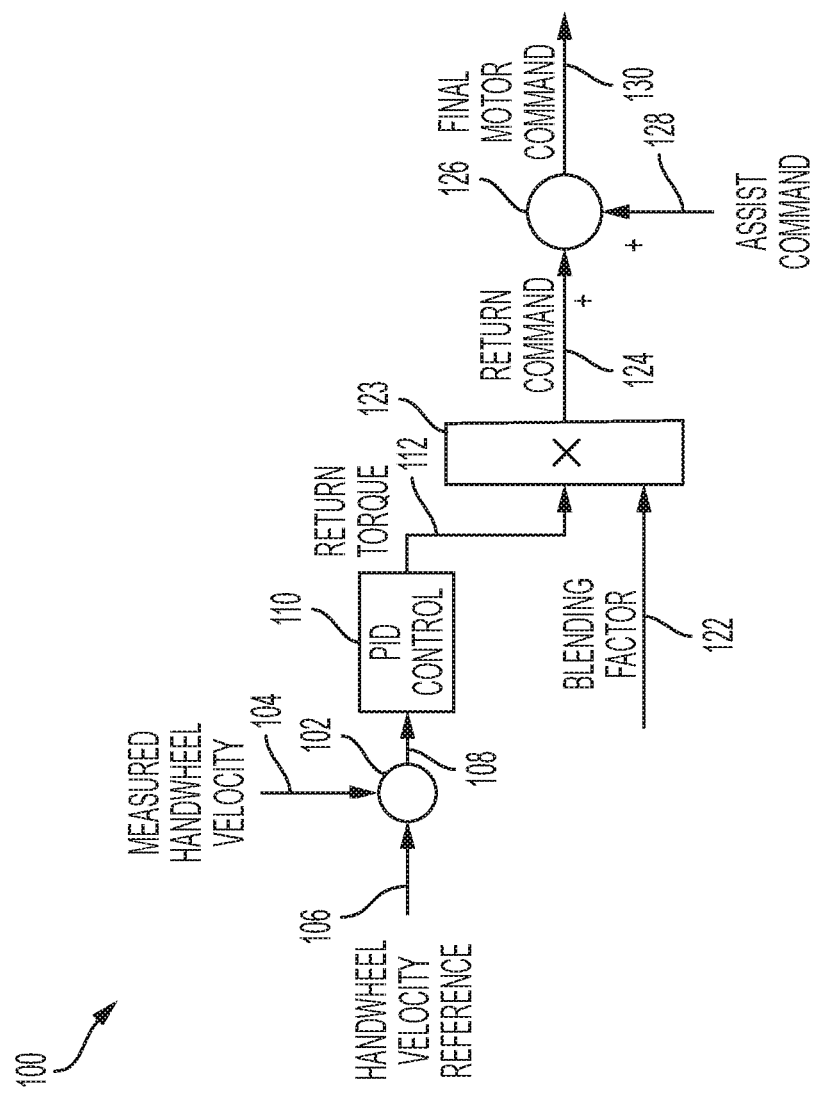
FIG. 2 illustrates a dataflow diagram of a controlled velocity function according to aspects of the present disclosure.

FIG. 2 illustrates a dataflow diagram of a controlled velocity return (CVR) function 100 to generate a motor command as a function of a handwheel velocity. The controlled velocity return function 100 may return the handwheel 26 to a predetermined position, such a centered position.

The controlled velocity return function 100 includes a difference block 102 configured to calculate a difference between a measured handwheel velocity 104 and a handwheel velocity reference 106. The handwheel velocity reference 106 may be a fixed value or a value that varies based on one or more factors, such as vehicle speed. The difference block 102 transmits the difference between the measured handwheel velocity 104 and the handwheel velocity reference 106 to a PID control 110 as a velocity error 108

Figure 5:
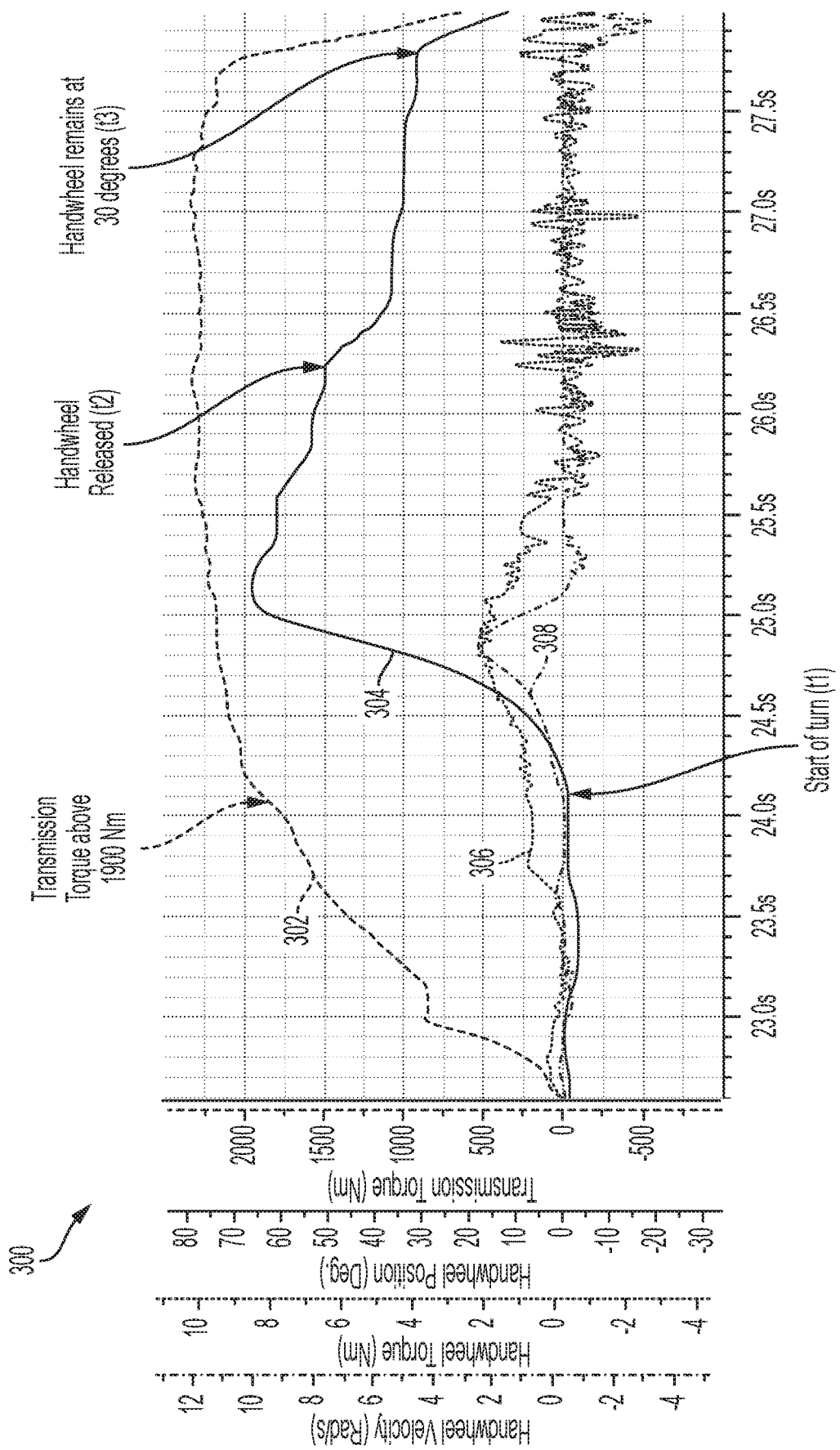
FIG. 5 depicts a graph including plots of several vehicle parameters during a traction steer event without traction steer mitigation.

The PID control 110 evaluates the output, and generates a return torque 112. The return torque 112 is multiplied by a blending factor 122 at multiplier 123 to generate a return command 124. The PID control 110 may include proportional-integral control having zero derivative-based control. The return command 124 is added to an assist command 128 at adder 126, where the assist command 128 is a function of assist torque, and any other EPS signals. A final motor command 130 is generated by combining the assist command 128 with the return command 124. As shown, the system described in FIG. 5 is applicable to a controlled velocity return function, which requires a handwheel 26 to return to a center position at a pre-defined velocity when the driver's hands are not present on the handwheel 26. The EPS determines that a driver's hands are no longer present on the wheel, and generates a motor torque to assist the return of the wheel to a center position. The absence of a driver's hands on the wheel is detected slower than desired when using t-bar torque. This is because of a time lag between the actual hands-off wheel event, and the decrease of the t-bar torque to a zero value. The t-bar torque is affected not only by driver torque but also handwheel inertia, damping, and other forces and assemblies in communication with the EPS. Following a hands off wheel event, driver torque typically decreases to a zero value more quickly than a t-bar torque. Thus, the driver torque can be used in one embodiment to responsively enable an assist torque. This allows a handwheel 26 to return to a center position after a minimal unassisted time interval. The implementation of the driver torque estimation module in a blending table to enable a smooth return of the handwheel to a center position.

Figure 3:
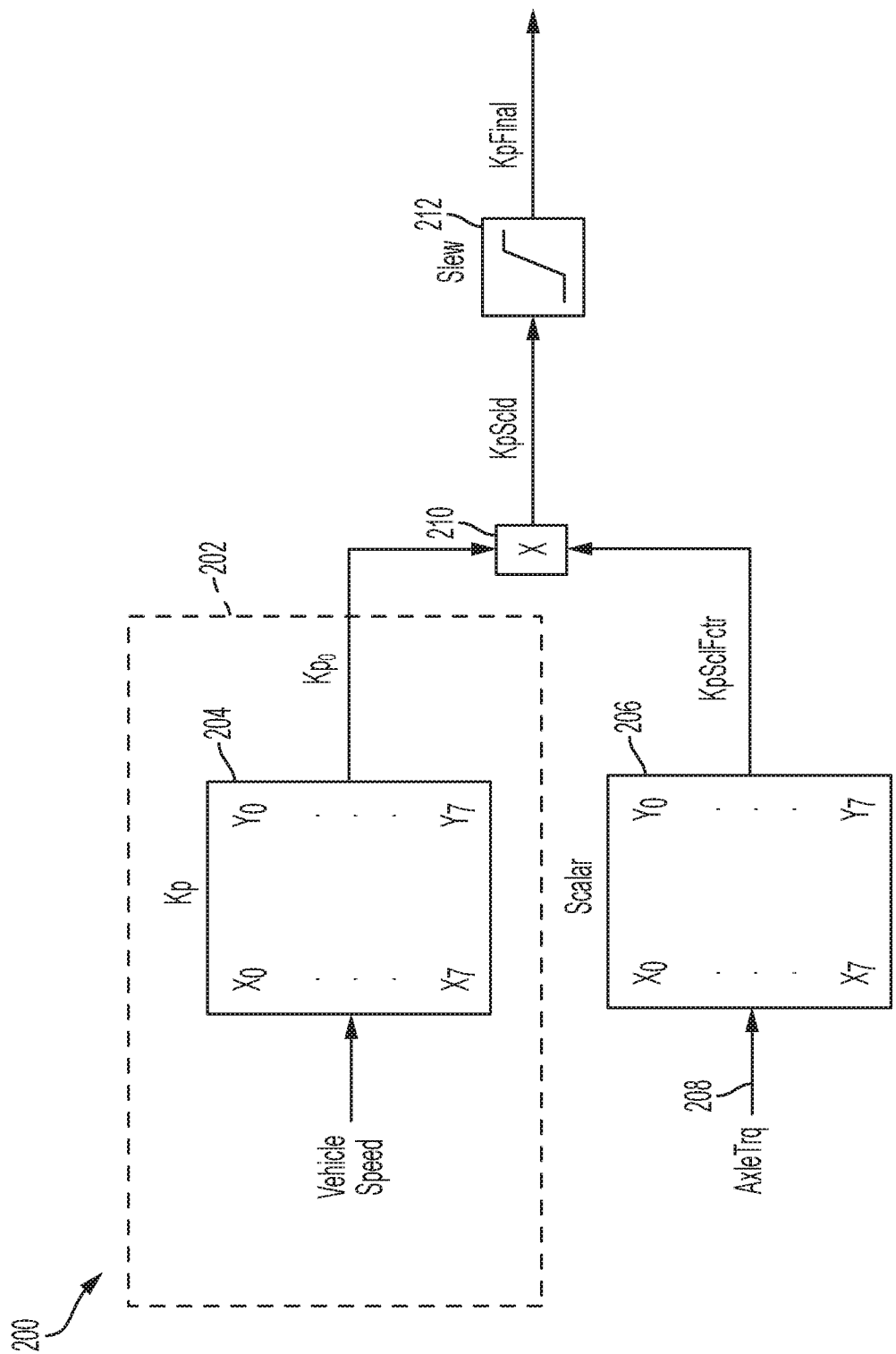
FIG. 3 depicts a block diagram for calculating a proportional gain value for the controlled velocity function according to aspects of the present disclosure.

FIG. 3 depicts a block diagram for calculating a final proportional gain value KpFinal for the controlled velocity function 100 according to aspects of the present disclosure. This final proportional gain value KpFinal is a tuning parameter used by the PID control 110 to calculate the return torque 112.

Specifically, FIG. 3 includes a speed-based calculator 202 to generate an initial proportional gain value $Kp_0$ as a function of vehicle speed. In some embodiments, and as shown in FIG. 3, a first lookup table 204 may be used to generate the initial proportional gain value $Kp_0$ as a function of vehicle speed. However, the initial proportional gain value $Kp_0$ may be generated other ways, such as by using one or more mathematical calculations based on the vehicle speed.

The traction torque signal may include one or more of an engine torque, a transmission torque, an axle torque, a longitudinal acceleration, a throttle position, an accelerator pedal position, or an acceleration signal. However, the traction torque signal may include any signal that indicates or represents a torque applied by a powertrain to accelerate the vehicle.

A proportional gain scale factor KpSclFctr is generated as a function of a traction torque signal. The proportional gain scale factor KpSclFctr is a scalar value. The proportional gain scale factor KpSclFctr may have a value between 0.0 and infinity. In one example implementation, the proportional gain scale factor KpSclFctr can have any value between 0.0 and 1000. In the example shown in FIG. 3, a second lookup table 206 is used to generate the proportional gain scale factor KpSclFctr based on the traction torque signal that is an axle torque 208. However, the proportional gain scale factor KpSclFctr may be generated other ways, such as by using one or more mathematical calculations based on the traction torque signal.

The initial proportional gain value $Kp_0$ is multiplied by the proportional gain scale factor KpSclFctr at multiplier 210 to generate a scaled proportional gain KpScld, which may be used by the PID control 110 to generate the return torque 112. Alternatively, and as shown in FIG. 3, a slew processor 212 may be used to limit a rate of change of the scaled proportional gain KpScld and to generate a final proportional gain KpFinal based on the scaled proportional gain KpScld. The final proportional gain KpFinal may then be used by the PID control 110 to generate the return torque 112. The slew processor 212 can mitigate the effect of a sudden change of the scaled proportional gain KpScld, limiting change in the motor command based upon the traction torque signal, per unit of time. The slew processor 212 can, therefore, prevent a sudden change in the traction torque signal from affecting the handwheel controlled velocity function 100 in a way that would cause a sudden and noticeable difference in the feel of the handwheel 26.

Figure 4:
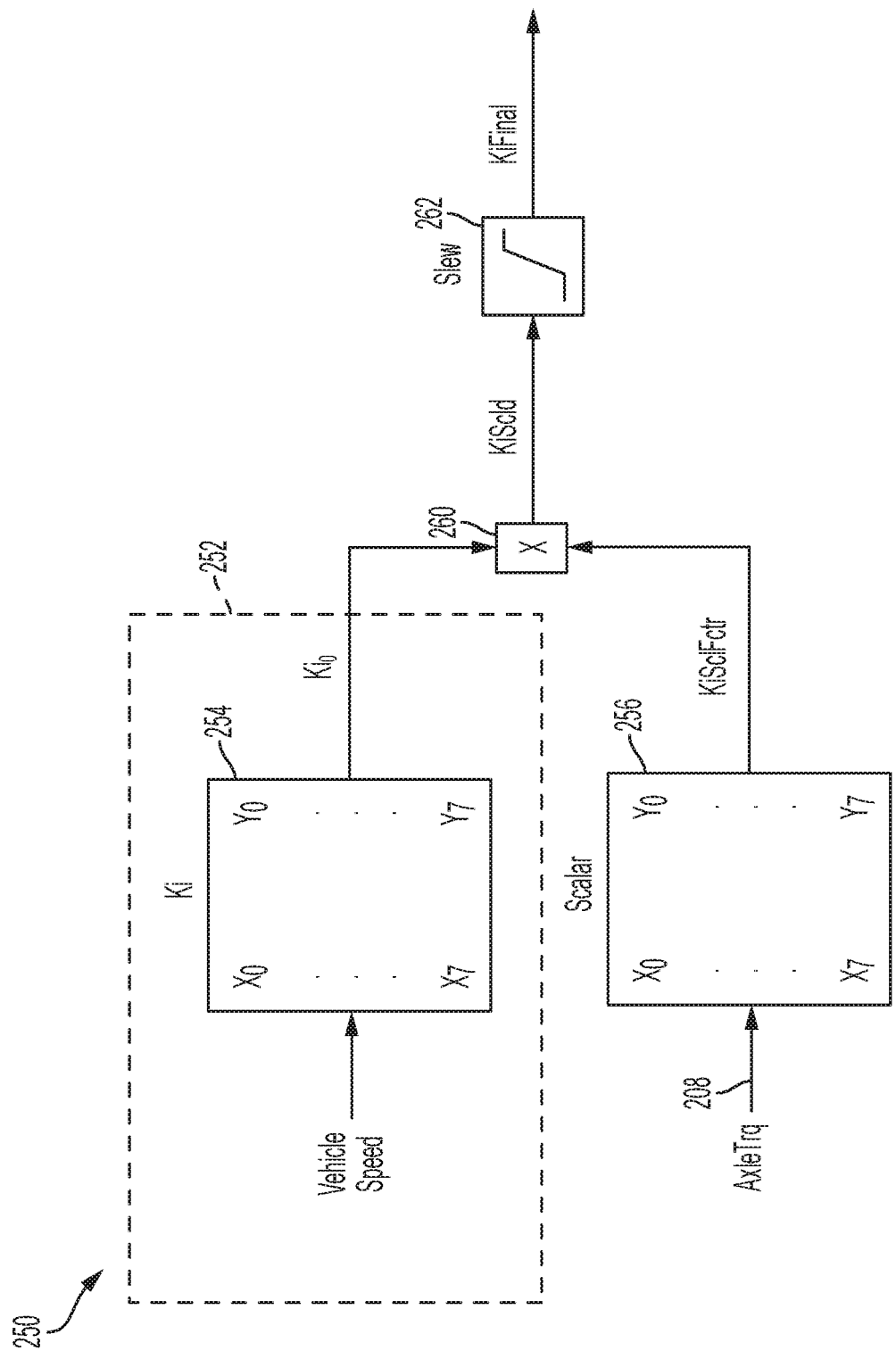
FIG. 4 depicts a block diagram for calculating an integral gain value for the controlled velocity function according to aspects of the present disclosure.

FIG. 4 depicts a block diagram for calculating a final integral gain value KiFinal for the controlled velocity function 100 according to aspects of the present disclosure. This final integral gain value KiFinal is a tuning parameter used by the PID control 110 to calculate the return torque 112.

Specifically, FIG. 4 includes a speed-based calculator 252 to generate an initial integral gain value $Ki_0$ as a function of vehicle speed. In some embodiments, and as shown in FIG. 4, a third lookup table 254 may be used to generate the initial integral gain value $Ki_0$ as a function of vehicle speed. However, the initial integral gain value $Ki_0$ may be generated other ways, such as by using one or more mathematical calculations based on the vehicle speed.

The traction torque signal may include one or more of an engine torque, a transmission torque, an axle torque, a longitudinal acceleration, a throttle position, an accelerator pedal position, or an acceleration signal. However, the traction torque signal may include any signal that indicates or represents a torque applied by a powertrain to accelerate the vehicle.

An integral gain scale factor KiSclFctr is generated as a function of a traction torque signal. The integral gain scale factor KiSclFctr is a scalar value. The integral gain scale factor KiSclFctr may have a value between 0.0 and infinity. In one example implementation, the integral gain scale factor KiSclFctr can have any value between 0.0 and 1000. In the example shown in FIG. 4, a fourth lookup table 256 is used to generate the integral gain scale factor KiSclFctr based on the traction torque signal that is an axle torque 258. However, the integral gain scale factor KiSclFctr may be generated other ways, such as by using one or more mathematical calculations based on the traction torque signal.

The initial integral gain value $Ki_0$ is multiplied by the integral gain scale factor KiSclFctr at multiplier 260 to generate a scaled integral gain KiScId, which may be used by the PID control 110 to generate the return torque 112. Alternatively, and as shown in FIG. 4, a slew processor 262 may be used to limit a rate of change of the scaled integral gain KiScId and to generate a final integral gain KiFinal based on the scaled integral gain KiScId. The final integral gain KiFinal may then be used by the PID control 110 to generate the return torque 112. The slew processor 262 can mitigate the effect of a sudden change of the scaled integral gain KiScId, limiting change in the motor command based upon the traction torque signal, per unit of time. The slew processor 262 can, therefore, prevent a sudden change in the traction torque signal from affecting the handwheel controlled velocity function 100 in a way that would cause a sudden and noticeable difference in the feel of the handwheel.

FIG. 5 depicts a graph 300 including plots 302, 304, 306, 308 of several vehicle parameters during a traction steer event without traction steer mitigation. Specifically, plot 302 shows transmission torque on a scale of −1000 to 3000 Nm; plot 304 shows handwheel position on a scale of −30 to 80 degrees; plot 306 shows handwheel torque on a scale of −4 to 11 Nm; and plot 308 shows handwheel velocity on a scale of −5 to 13 Rad/s.

FIG. 5 illustrates a scenario in which a turn is conducted while the vehicle is in a high-torque condition. Specifically, the transmission torque is above 1900 Nm throughout the turn. The turn is started at time t1, as shown by an increase in the handwheel position starting at that time. The handwheel is released at time t2, as shown by a decrease in the handwheel position at that time. However, the handwheel remains stuck at about 30-degrees until the transmission torque reduces. This sticking or holding of the handwheel position as a result of the traction torque is known as a "traction steer event."

Figure 6:
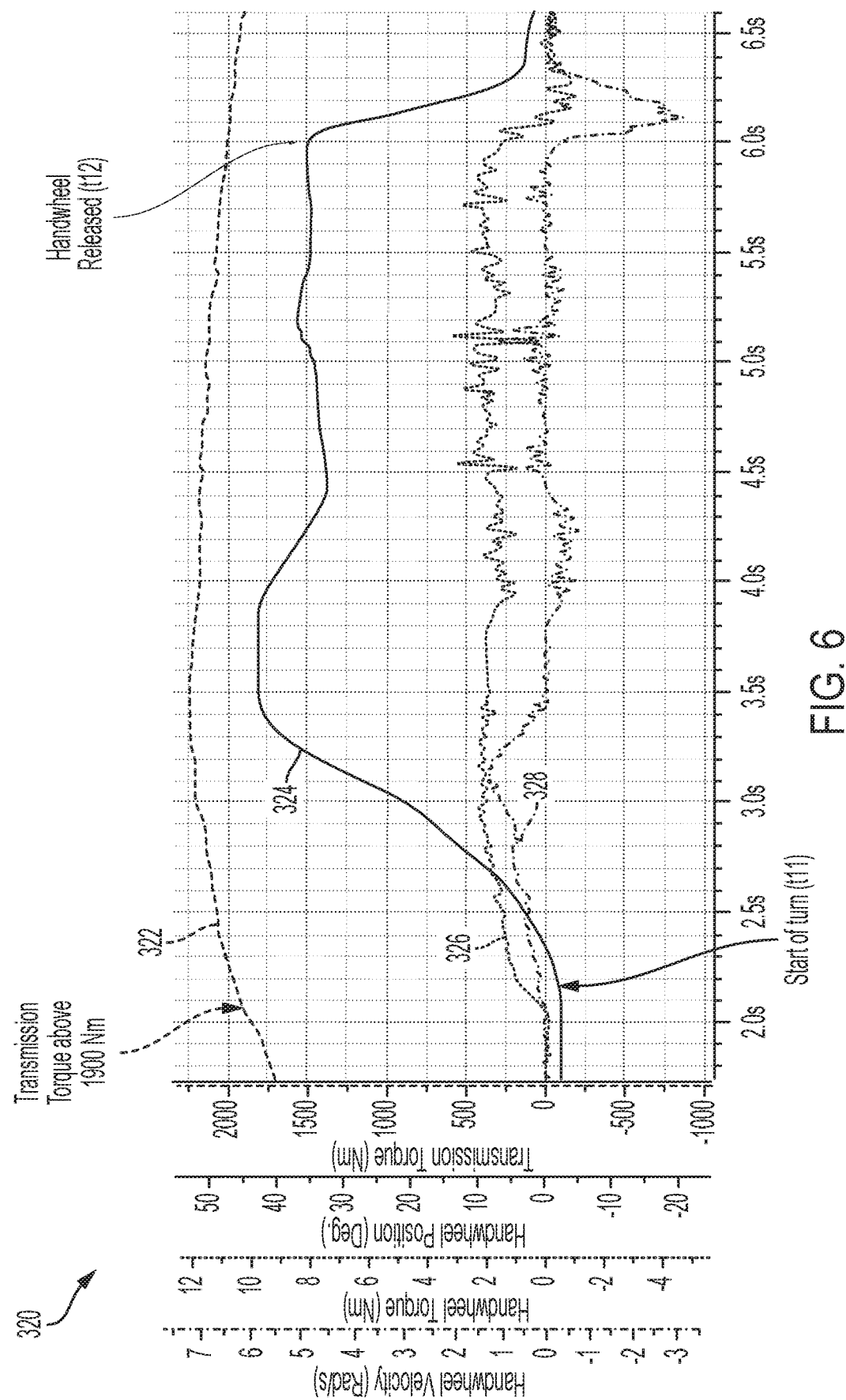
FIG. 6 depicts a graph including plots of several vehicle parameters during a traction steer event with traction steer mitigation.

FIG. 6 depicts a graph 352 including plots 322, 324, 326, 328 of several vehicle parameters during a traction steer event with traction steer mitigation as provided by the method and system of the present disclosure.

Specifically, plot 322 shows transmission torque on a scale of −1000 to 2500 Nm; plot 324 shows handwheel position on a scale of −20 to 55 degrees; plot 326 shows handwheel torque on a scale of −5 to 12 Nm; and plot 328 shows handwheel velocity on a scale of −4 to 8 Rad/s.

FIG. 6 illustrates a scenario in which a turn is conducted while the vehicle is in a high-torque condition. Specifically, the transmission torque is above 1900 Nm throughout the turn. The turn is started at time t11, as shown by an increase in the handwheel position starting at that time. The handwheel is released at time t12, as shown by a decrease in the handwheel position at that time. Unlike the case shown in FIG. 5, the traction steer mitigation system of the present disclosure is effective to cause the handwheel position to returns to the 0-degree (neutral) position at time t12, despite the transmission torque remaining at an elevated value.

A method for controlling a power steering system, such as a power steering system for vehicle, is also provided. The method comprises: generating a motor command as a function of a handwheel velocity; modifying the motor command based upon a traction torque signal, the traction torque signal indicating a torque applied by a powertrain to accelerate the vehicle; and applying the motor command to an actuator of the power steering system.

In some embodiments, the traction torque signal may include one or more of an engine torque, a transmission torque, an axle torque, a longitudinal acceleration, a throttle position, an accelerator pedal position, or an acceleration signal.

In some embodiments, the step of generating the motor command as a function of the handwheel velocity may include calculating a return signal using a control loop having at least one tuning parameter, and the step of modifying the motor command based upon the traction torque signal comprises adjusting the at least one tuning parameter based upon the traction torque signal. The at least one tuning parameter may include a proportional gain or an integral gain of the control loop.

In some embodiments, the step of adjusting the at least one tuning parameter based upon the traction torque signal may include multiplying the at least one tuning parameter by a scalar value, with the scalar value being determined by a lookup table based upon the traction torque signal.

In some embodiments, the step of adjusting the at least one tuning parameter based upon the traction torque signal may include calculating a scalar value as a function of the traction torque signal, and multiplying the at least one tuning parameter by the scalar value.

In some embodiments the method may further include generating a return command based upon the handwheel velocity, with the motor command being a function of the return command. Modifying the motor command based upon the traction torque signal may include scaling the return command based upon the traction torque signal.

In some embodiments, the step of scaling the return command based upon the traction torque signal comprises multiplying the return factor by a scalar value that is determined by a lookup table based upon the traction torque signal. In some other embodiments, the step of scaling the return command based upon the traction torque signal comprises calculating a scalar value as a function of the traction torque signal, and multiplying the return factor by the scalar value.

In some embodiments, the method may further include limiting a change in the motor command based upon the traction torque signal, per unit of time.

In some embodiments, the method step of generating the motor command as a function of the handwheel velocity includes calculating a return signal using a control loop having at least one tuning parameter; the method step of modifying the motor command based upon the traction torque signal comprises adjusting the at least one tuning parameter based upon the traction torque signal; and the method step of limiting the change in the motor command based upon the traction torque signal per unit of time comprises limiting an amount change in the at least one tuning parameter, per unit of time.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A control system for a power steering system, the control system comprising:
   a processor; and
   memory that includes instructions that, when executed by the processor, cause the processor to:
   generate a motor command as a function of a handwheel velocity;
   modify the motor command based upon a traction torque signal,
   wherein generating the motor command as a function of the handwheel velocity includes:
      calculating a velocity error as a difference between the handwheel velocity and a reference signal; and
      calculating, using a control loop having at least one tuning parameter, a return signal based on the velocity error; and
   wherein modifying the motor command based upon the traction torque signal comprises adjusting the at least one tuning parameter of the control loop based upon the traction torque signal.

2. The control system of claim 1, wherein the traction torque signal is one of an engine torque, a transmission torque, an axle torque, a longitudinal acceleration, a throttle position, an accelerator pedal position, or an acceleration signal.

3. The control system of claim 1, wherein the at least one tuning parameter is one of a proportional gain or an integral gain of the control loop.

4. The control system of claim 1, wherein adjusting the at least one tuning parameter based upon the traction torque signal comprises multiplying the at least one tuning parameter by a scalar value, the scalar value being determined by a lookup table based upon the traction torque signal.

5. The control system of claim 1, wherein adjusting the at least one tuning parameter based upon the traction torque signal comprises calculating a scalar value as a function of the traction torque signal, and multiplying the at least one tuning parameter by the scalar value.

6. The control system of claim 1, wherein the instructions, when executed by the processor, further cause the processor to generate a return command based upon the handwheel velocity, with the motor command being a function of the return command; and
   wherein modifying the motor command based upon the traction torque signal further comprises scaling the return command based upon the traction torque signal.

7. The control system of claim 6, wherein scaling the return command based upon the traction torque signal comprises multiplying a return factor by a scalar value, the scalar value being determined by a lookup table based upon the traction torque signal.

8. The control system of claim 6, wherein the instructions, when executed by the processor, further cause the processor to limit a change in the motor command based upon the traction torque signal, per unit of time.

9. The control system of claim 1, wherein the traction torque signal indicates at least one of an engine torque, a transmission torque, or an axle torque.

10. A method for controlling a power steering system, the method comprising:
   generating a motor command as a function of a handwheel velocity;
   modifying the motor command based upon a traction torque signal;
   applying the motor command to an actuator of the power steering system,
   wherein generating the motor command as a function of the handwheel velocity includes:
      calculating a velocity error as a difference between the handwheel velocity and a reference signal; and
      calculating, using a control loop having at least one tuning parameter, a return signal based on the velocity error; and
   wherein modifying the motor command based upon the traction torque signal comprises adjusting the at least one tuning parameter of the control loop based upon the traction torque signal.

11. The method of claim 10, wherein the traction torque signal is one of an engine torque, a transmission torque, an axle torque, a longitudinal acceleration, a throttle position, an accelerator pedal position, or an acceleration signal.

12. The method of claim 10, wherein the at least one tuning parameter is one of a proportional gain or an integral gain of the control loop.

13. The method of claim 10, wherein adjusting the at least one tuning parameter based upon the traction torque signal comprises multiplying the at least one tuning parameter by a scalar value, the scalar value being determined by a lookup table based upon the traction torque signal.

14. The method of claim 10, wherein adjusting the at least one tuning parameter based upon the traction torque signal comprises calculating a scalar value as a function of the traction torque signal, and multiplying the at least one tuning parameter by the scalar value.

15. The method of claim 10, further comprising generating a return command based upon the handwheel velocity, with the motor command being a function of the return command; and
   wherein modifying the motor command based upon the traction torque signal further comprises scaling the return command based upon the traction torque signal.

16. The method of claim 15, wherein scaling the return command based upon the traction torque signal comprises multiplying a return factor by a scalar value, the scalar value being determined by a lookup table based upon the traction torque signal.

17. The method of claim 15, wherein scaling the return command based upon the traction torque signal comprises calculating a scalar value as a function of the traction torque signal, and multiplying a return factor by the scalar value.

18. The method of claim 10, further comprising limiting a change in the motor command based upon the traction torque signal, per unit of time.

19. The method of claim 18, wherein generating the motor command as a function of the handwheel velocity includes calculating a return signal using a control loop having at least one tuning parameter;
   wherein modifying the motor command based upon the traction torque signal comprises adjusting the at least one tuning parameter based upon the traction torque signal; and
   wherein limiting the change in the motor command based upon the traction torque signal per unit of time comprises limiting an amount change in the at least one tuning parameter, per unit of time.

20. The method of claim 10, wherein the traction torque signal indicates at least one of an engine torque, a transmission torque, or an axle torque.

* * * * *